Jan. 23, 1951 J. E. DINGER 2,538,768
SATURABLE REACTOR CONTROL FOR MACHINE TOOL MOTORS
Filed July 28, 1948 2 Sheets-Sheet 1

INVENTOR.
Jacob E. Dinger.
BY
M. C. Hayes
ATTORNEY.

Jan. 23, 1951  J. E. DINGER  2,538,768
SATURABLE REACTOR CONTROL FOR MACHINE TOOL MOTORS
Filed July 28, 1948  2 Sheets-Sheet 2
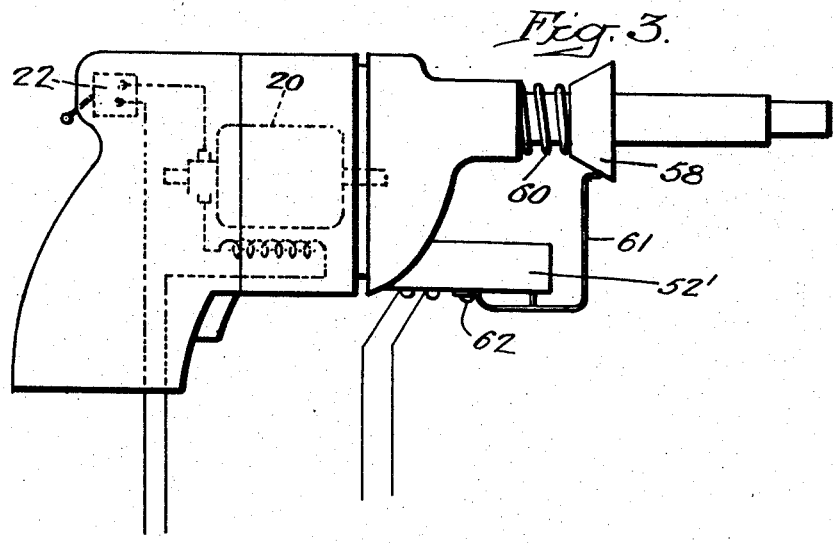
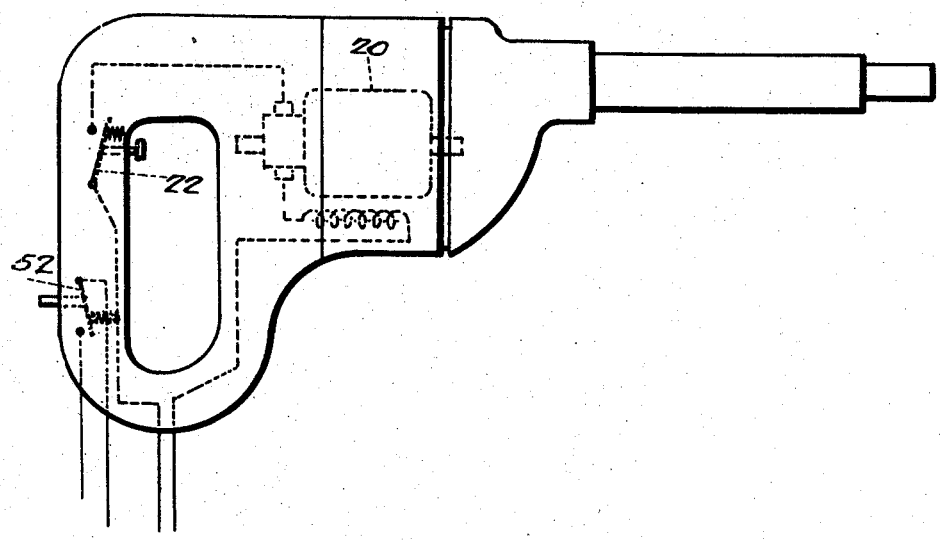
INVENTOR
Jacob E. Dinger
BY
ATTORNEY.

Patented Jan. 23, 1951

2,538,768

UNITED STATES PATENT OFFICE 2,538,768

SATURABLE REACTOR CONTROL FOR MACHINE TOOL MOTORS

Jacob E. Dinger, Washington, D. C.

Application July 28, 1948, Serial No. 41,162

11 Claims. (Cl. 318—476)

(Granted under the act of March 3, 1883, as amended April 30, 1928; 370 O. G. 757)

The present invention relates to a control for a machine tool motor, especially of the type which operates a tube roller or tube expander.

A purpose of my invention is to eliminate the necessity of employing a switch, relay or other moving parts to disconnect a machine tool motor when the load reaches a predetermined value, thus obtaining faster operation.

A further purpose is to control a machine tool motor by regulating the direct current in a saturable reactor so that variation of this current under precise triggering action will shut off the operation of the machine tool.

A further purpose is to compare the peaks of alternating current voltage in the motor winding with a constant direct current voltage, to apply the comparison to a diode, to create a signal when the alternating current peaks reach a predetermined value, to apply the signal to the control grid of a first gas filled tube, to render the first gas filled tube conducting, and by the conduction of the first gas filled tube to cause a second gas filled tube to cease to conduct and thereby cut off direct current from the direct current winding of a saturable reactor.

A further purpose is to interpose a condenser between the anodes of two gas filled tubes in a suitable circuit, to assist in rendering one tube conducting when the other is not conducting and vice versa.

A further purpose is to employ a switch in a suitable circuit to connect the cathode and control grid of one of the gas filled tubes together to render such tube conducting.

Further purposes appear in the specification and in the claims.

Figures 2, 3 and 4 are elevations of the tube expander and the switching arrangement, Figure 2 being partly in longitudinal section.

Figure 1:
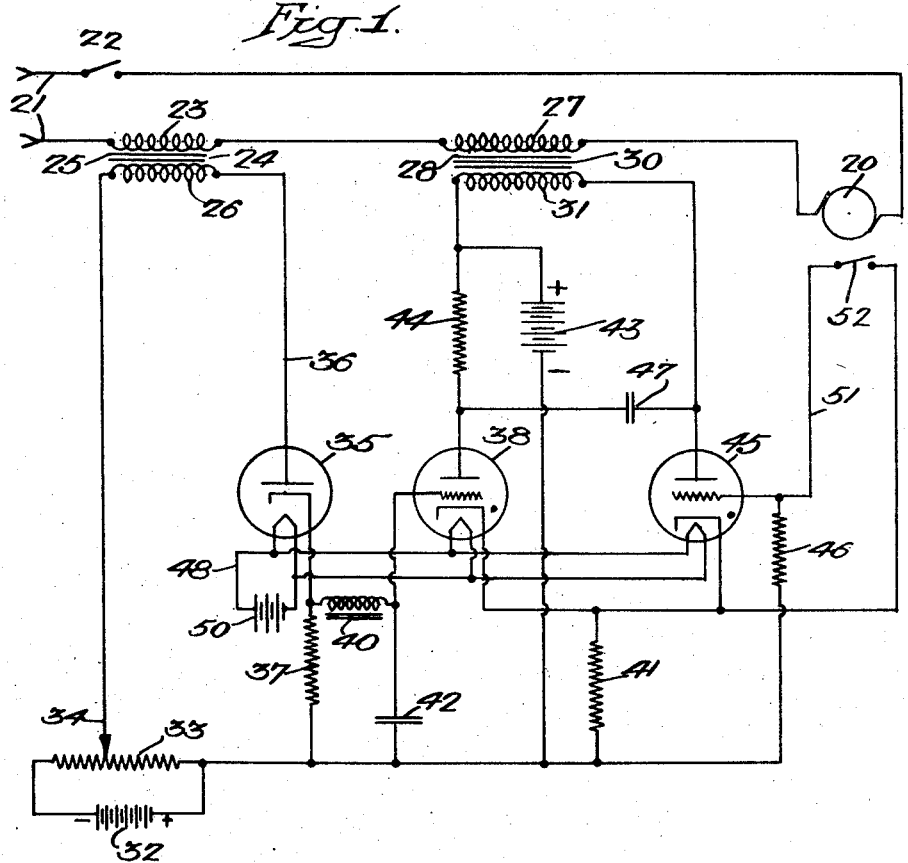
Figure 1 is a circuit diagram useful in explaining my invention.

Describing in illustration but not in limitation and referring to the drawings:

In the U. S. Patent No. 2,431,316, granted November 25, 1947, to me jointly with Frank E. Dudley, for Electronic Current Limiter System for Machine Tool Motors, a device is described for limiting the current in a machine tool motor in response to the triggering action of a gas tube which operates a relay controlling the motor circuit. This is a highly accurate system and the delay in breaking of the circuit due to chattering of the relay has been minimized by virtue of the triggering action. It does however involve moving parts which are subject to wear, and the time interval for breaking the circuit is limited by the time necessary to translate the moving parts of the relay. For some purposes it is desirable to eliminate these moving parts and to eliminate this short time interval, and also to eliminate any pulse which may occur from arcing at the contacts by providing control without the necessity of a relay.

The device of the present invention finds its best application in the control of the motor of an electric tapping gun or the like employed in expanding or rolling tubes of heat exchangers such as boilers and condensers. It will, however, be understood that the current limiting system of the present invention may be applied to any other suitable application, as for example to the control of motors on drills, taps, and numerous other machining operations.

In accordance with the present invention the direct current saturation of a saturable reactor is adjusted electronically by the triggering action of a gas tube, so that the reactor will vary its alternating current impedance in the motor circuit.

Considering first the circuit of Figure 1, a motor 20 of a machine tool is connected to alternating current leads 21 through a motor switch 22 which is normally open and is closed to start the motor.

In series with the motor 20 is the primary 23 of a transformer 24 having a magnetizable core 25 and a secondary winding 26. Also in series with the motor and with the primary 23 is an alternating current winding 27 of a saturable reactor 28 having a magnetizable core 30 and having a direct current winding 31. The windings 27 and 31 are both around the same core 30.

As well known the saturable reactor is a specially designed transformer having an A. C. impedance of its alternating current winding which can be varied between very wide limits by changing the magnitude of the direct current through the direct current winding. The core is of high magnetic permeability under normal conditions but readily reaches magnetic saturation upon the application of a comparatively weak magnetic field, thus causing the effective permeability to drop to a low value as long as this weak field persists.

If the direct current through the winding 31 is zero, the alternating current impedance of the winding 27 is very high because of the high self inductance of the winding 27, wound on the core of high permeability. If, however, a direct current of suitable magnitude is passed through the winding 31, the direct current magnetic field produces saturation of the core, and the self inductance of the alternating current winding 27 drops to a low value which approaches that of the winding 27 about an air core. This reduces the alternating current impedance of the alternating current winding 27 to a desirable low value.

A source of suitably constant direct current voltage 32 is connected across a potentiometer 33, the slider 34 of which is connected to one side of the secondary 26 of the transformer 24. A vacuum tube diode 35 having an anode and cathode is connected in circuit with the potentiometer and the secondary of the transformer by connecting the opposite side of the secondary of the transformer to the anode at 36 and connecting the positive terminal of the source 32 and the corresponding terminal of the potentiometer to the cathode through resistor 37.

A gas filled tube 38 having an anode, cathode and control grid receives a signal from the cathode of the diode 35 to the control grid of the gas filled tube. The cathode of the gas filled tube 38 is connected to one side of a cathode biasing resistor 41, the other side of which is connected to the control grid. An inductor 40 is interposed between the cathode of gas tube 35, and the control grid of gas tube 38, and a capacitor 42 is interposed between the resistor 41 and the control grid in order to filter high frequency pulses resulting from the commutation of the motor. An anode source of direct current 43 has its negative terminal connected to the opposite side of the cathode biasing resistor 41 from that connected to the cathode and its positive side is connected to the anode of the gas tube 38 through resistor 44.

A second gas filled tube 45 has an anode, cathode, and control grid, the anode being connected through the direct current winding 31 of the saturable reactor to the positive side of the anode direct current source 43. The cathode is connected to the cathode of gas filled tube 38 and to the cathode biasing resistor 41. The control grid of the gas filled tube 45 is connected to the negative side of the direct current source 43 through resistor 46.

A capacitor 47 is interposed between the anodes of the gas filled tubes 38 and 45.

The various tubes may desirably be of heater cathode type, and a heater circuit 48 is shown connected to a heater source of direct current 50.

A switch circuit 51 is provided between the control grid of the second gas filled tube 45 and the cathode, so that a normally closed switch 52 (closed when the control device is not operating, and opened manually or by operation of the machine tool) will connect the cathode to the control grid, thus making zero bias voltage between grid and cathode.

Figure 2:
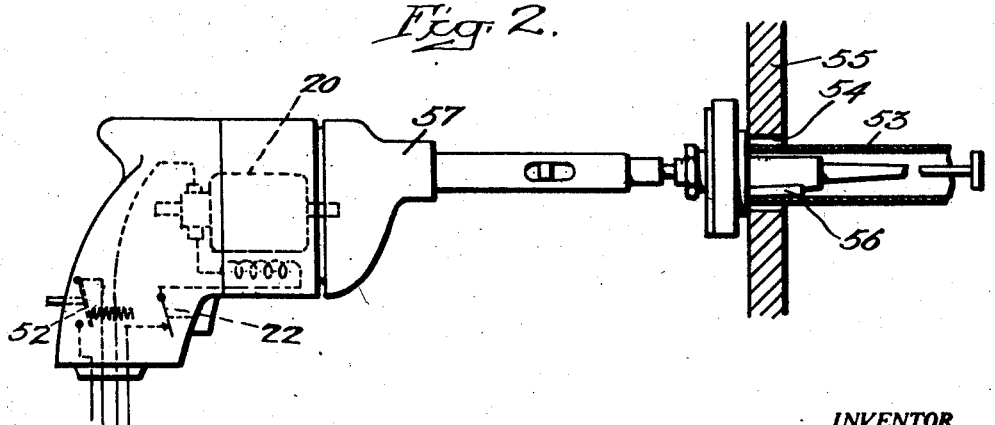

The operation of the machine tool is suggested in Figure 2 where a tube 53 of a boiler or other heat exchanger passes through an opening 54 in a tube sheet 55 and is expanded by an expander 56 operating from a machine tool 57, suitably a tap gun, through the action of the motor 20. In the form of Figure 2 the main switch 22 is trigger operated, and the normally closed switch 52 is opened manually by the operator. As shown in Figure 3, the switch 52' there shown is opened by a tapered collar 58 moving with the mandril so that the rearward movement of the collar 58 causes the switch to open when pressure is applied on the machine tool to roll the tube. A spring 60 restores the collar to the position for closing of the switch under the action of spring arm 61 secured at 62. In Figure 4 I illustrate a variant form of tap gun in which the main switch is located one inside a hollow grip rather than being located at the trigger or other heel of a grip as shown in Figures 2 and 3.

In operation the circuit functions as follows:

The switch 52 is normally closed when the machine tool is not being employed to roll in a tube. When the switch 52 is closed, the control grid of the gas filled tube 45 is of course at the same potential as the cathode and the tube 45 is in a conducting state. The gas filled tubes 38 and 45 are connected so as to provide trigger action. The anode current provided by the direct current source 43 for the gas filled tube 45 flows also through the direct current winding 31 of the saturable reactor. This current saturates the core of the reactor so that the impedance of the alternating current winding 27 to the alternating current is reduced to a low value, and practically the full voltage of the alternating power source is applied across the terminals of the motor, causing the motor to run.

The gas filled tube 38 is not now in a conducting state as its control grid is at a sufficiently high negative bias potential with respect to the cathode so that the negative grid prevents the ionization of the gas and prevents the gas filled tube from conducting. This biasing potential is created by the anode current of gas filled tube 45 flowing through cathode biasing resistor 41. The voltage across direct current winding 31 of the saturable reactor charges the condenser 47 with a polarity such that the condenser terminal connected to the anode of gas filled tube 38 is positive with respect to the condenser terminal connected to the gas filled tube 45.

When a tube rolling operation or other machine tool operation is started, the switch 52 is opened, either by movement of the spindle of the expander as in Figure 3 or manually as in Figures 2 and 4. The opening of the switch 52 does not alter the conduction of the already conducting gas filled tube 45 because the grid of that tube does not have control over the gaseous discharge.

As the operation of rolling the tube progresses and the torque required to rotate the expander increases, the alternating current supplied to the motor through the primary 23 of the transformer increases as a function of the output torque of the motor. As this current increases, the alternating current voltage appearing across the secondary of the transformer also increases until positive peaks of alternating current voltage exceed the direct current voltage provided by the constant direct current source 32, between the rider of the potentiometer and the positive terminal of the constant source, by a predetermined amount depending upon that required to render the diode 35 conducting. When the positive peaks of alternating current voltage thus exceed this constant direct current voltage, the diode becomes conducting during such positive peaks and produces positive pulses across the resistor 37, which are in turn applied to the control grid of the first gas filled tube 38 through the inductor 40.

When these pulses attain a required magnitude, a gaseous discharge is initiated in gaseous tube 38, causing such tube to become conducting. This conduction suddenly reduces the potential of the anode of gaseous tube 38 and because of the polarity of the charge on condenser 47, a negative pulse is applied to the anode of gaseous tube 45.

The negative pulse on the anode of gaseous tube 45 extinguishes the current through gaseous tube 45, and upon the deionization of the gaseous tube 45 the grid of such tube regains control. Because of the existing negative bias on the gaseous tube 45, this tube continues to be non-conducting, thus stopping the flow of direct current through the direct current winding 31 of the saturable reactor. The cessation of the current through the direct current winding causes the core of the saturable reactor to lose its saturation, so that the alternating current winding of the saturable reactor now offers a comparatively large impedance to the alternating current. This large impedance causes practically the entire supply voltage to appear across the alternating current winding of the saturable reactor, and lowers the voltage across the motor 20 to such an extent that the motor must stop.

Thus the motor is stopped automatically when the output torque reaches a value determined by the setting of the slider on potentiometer 33.

Once the expander is withdrawn from the tube end sufficiently to close switch 52, or once switch 52 is closed manually, the negative bias from the grid of gaseous tube 45 is removed and the tube becomes conducting, and the resulting plate current through the direct current winding of the saturable reactor reduces the impedance of the alternating current winding to a low value which permits the alternating current supply voltage to appear across the motor and thus start the motor. In the meantime the motor may if desired be reversed by means old in the art and commonly used in connection with tube expanders. The sudden initiation of conduction through the tube 45 suddenly decreases the potential of the anode of that tube, which in turn applies a negative pulse to the anode of gaseous tube 38 by means of condenser 47. This negative pulse reduces the voltage across the gaseous tube 38, causing the deionization of the gas and permitting the grid to gain control of the tube.

Thus the device has now reached the completion of its cycle and is ready to roll the next tube.

It will be evident that the direct current sources 32 and 43, while shown as batteries, may be of any suitable character, for example direct current or rectified alternating current from a power connection.

It will be evident that alternating current may be used for heating the cathodes of all tubes.

By way of example the following tube types and impedance values have been found suitable for the components referred to in Figure 1:

| | |
|---|---|
| Tube 35 | Type 6H6 |
| Tubes 38 and 45 | Type 884 or 2050 |
| Resistor 33 | 150,000 ohms |
| Resistor 37 | 120,000 ohms |
| Resistor 41 | 700 ohms |
| Resistor 44 | 5,000 ohms |
| Resistor 46 | 250,000 ohms |
| Battery 32 | 75 volts |
| Battery 43 | 250 volts |
| Battery 50 | 6 volts |
| Capacitor 42 | 0.05 microfarads |
| Capacitor 47 | 2 microfarads |
| Inductor 40 | 20 henries |
| Transformer 24 | Special transformer or 6.3 volt filament heater type with proper shunting resistors |

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

Having thus described my invention what I claim as new and desire to secure by Letters Patent is:

1. In a control for an alternating current machine tool motor, a comparison circuit responsive to the current in the machine tool motor and including means for creating a pulse when the machine tool motor current peaks exceed a predetermined value, a saturable reactor having a core, an alternating current winding around the core and in series with the machine tool motor, a direct winding around the core, and a direct current trigger circuit including a gaseous tube in series with the direct current winding, which is conducting while the motor is operating on normal load and which is connected to receive the pulse and thereby become non-conducting when the motor load increases to a predetermined level.

2. A current limiter for a machine tool having a motor winding connected to an alternating current source, comprising a saturable core reactor having a core, having an alternating current inductance winding in series with the motor winding and on the core and having a direct current inductance winding on the core, a gas tube having a cathode, an anode and a control grid, a source of direct current, an anode circuit including the direct current winding and the direct current source, a bias resistor, a grid circuit for the gas tube including the bias resistor and a direct current source, a cathode circuit for the gas tube connected to the direct current source, and means including a constant source of direct current voltage for comparing the current in the motor winding with the constant direct voltage and applying to the anode of the gas tube a negative pulse when the peaks of voltage in the motor winding exceed the constant direct voltage by a predetermined value.

3. A current limiter for a machine tool, having a motor winding connected to an alternating current source comprising a saturable core reactor having a core, having an alternating current winding in series with the motor winding and on the core and having a direct current winding on the core, a gas tube having a cathode, an anode and a control grid, a source of direct current, an anode circuit including the direct current winding and the source of direct current, a bias resistor, a grid circuit for the gas tube including the bias resistor and the direct current source, a cathode circuit for the gas tube connected to the direct current source, a switch, a switching circuit connecting the cathode to the control grid through the switch when the switch is closed, and means including a source of constant direct current voltage for comparing peaks of voltage which are a function of the voltage in the motor winding with the constant direct voltage and applying to the anode of the gas tube a negative pulse when the peaks of voltage predominate over the constant direct voltage to a predetermined extent.

4. A current limiter for a machine tool having an electric motor connected to an alternating current source, comprising means to produce a first voltage which is a function of the current flowing through the motor, a source of direct current voltage of known magnitude, a vacuum tube containing an anode and a cathode, means for applying the difference between said voltages between said anode and cathode, a first gaseous tube containing a grid, said grid being excited by the output signal from said vacuum tube and said gaseous tube being arranged to break down and become conducting upon application to the grid of a positive pulse exceeding a predetermined value, a second gaseous tube containing a grid, the grid of the second gaseous tube being arranged to conduct when the first gaseous tube is non-conducting, a condenser interposed between the anodes of the first and second gaseous tubes, a saturable reactor having a core, having an alternating current winding on the core connected in series with the motor and having a direct current winding on the core, means for providing current flow through the direct current winding from the second gaseous tube when the second gaseous tube is conducting and for cutting off the current flow through the direct current winding when the second gaseous tube is non-conducting, and means for cutting off grid bias of the second gaseous tube.

5. A current limiter for a machine tool having an electric driving motor and an alternating current source comprising a transformer having a primary and a secondary, the primary being included in the motor circuit and the secondary producing a voltage which is a direct function of the motor current, a regulated voltage source producing a constant voltage, means for comparing the voltages and for producing a signal when the voltage peaks which are a function of the current in the motor exceed the voltage of the constant source by a predetermined value, a gas filled tube having a cathode, an anode and a control grid, a source of bias voltage acting on the control grid, means for eliminating the bias from the control grid, means for impressing on the anode a negative pulse when the difference in voltages attains a predetermined value, a saturable reactor having a core, having an alternating current winding on the core in series with the motor and with the primary of the transformer and having a direct current winding on the core, connections for applying direct current to the direct current winding from the gas tube when the gas tube is conducting and a source of direct current connected to the gas tube and to the direct current winding.

6. A current limiter for a machine tool having a motor winding connected to an alternating current source, comprising a transformer having a primary and a secondary, the primary being in series with the motor winding, a source of direct current of constant voltage, a diode having an anode and a cathode, means for comparing the voltage of the secondary of the transformer and the constant direct voltage and applying across the anode and cathode of the diode the resultant voltage, a first gaseous tube having an anode, cathode and a control grid, means for applying to the control grid a signal from the diode, a saturable reactor having a core, having an alternating current winding on the core in series with the primary of the transformer and with the motor winding and having a direct current winding on the core, a source of direct current, connections between the source of direct current and the anode and cathode of the first gaseous tube, a second gaseous tube having an anode, a cathode and a control grid, means for connecting the anode and cathode of the second gaseous tube to the source in series with the direct current winding of the saturable reactor, means for biasing the control grid of the second gaseous tube and means for applying to the anode of the second gaseous tube a reversed pulse from the anode of the first gaseous tube, whereby one gaseous tube will be conducting when the other is non-conducting and vice versa.

7. A current limiter for a machine tool having a motor winding connected to an alternating current source, comprising a transformer having a primary and a secondary, the primary being in series with the motor winding, a source of direct current of constant voltage, a diode having an anode and a cathode, means for comparing the voltage of the secondary of the transformer and the constant voltage and applying across the anode and cathode of the diode the resultant voltage, a first gaseous tube having an anode, a cathode and a control grid, means for applying to the control grid of the first gaseous tube a signal from the diode, a saturable reactor having a core, having an alternating current winding on the core in series with the primary of the transformer and with the motor winding and having a direct current winding on the core, a source of direct current, connections between the source of direct current and the anode and cathode of the first gaseous tube, a second gaseous tube having an anode, a cathode and a control grid, means for connecting the anode and cathode of the second gaseous tube to the source in series with the direct current winding of the saturable reactor, means for biasing the control grid of the second gaseous tube and means including a condenser for applying to the anode of the second gaseous tube a reversed pulse from the first gaseous tube, whereby the two gaseous tubes are conducting at different times.

8. A current limiter for a machine tool having a motor winding connected to an alternating current source, comprising a transformer having a primary and a secondary, the primary being in series with the motor winding, a source of direct current of constant voltage, a diode having an anode and a cathode, means for comparing the voltage of the secondary of the transformer and the constant voltage and applying across the anode and cathode of the diode the resultant voltage, a first gaseous tube having an anode, a cathode and a control grid, means for applying to the control grid a signal from the diode, a saturable reactor having a core, having an alternating current winding on the core in series with the primary of the transformer and with the motor winding and having a direct current winding on the core, a source of direct current, connections between the source of direct current and the anode and cathode of the first gaseous tube, a second gaseous tube having an anode, a cathode and a control grid, means for connecting the anode and cathode of the second gaseous tube to the source in series with the direct current winding of the saturable reactor, means for biasing the control grid of the second gaseous tube, means including a condenser between the anodes of the first and second gaseous tubes for applying a reversed pulse from the anode of the first gaseous tube to the anode of the second gaseous tube and a switch connecting the control grid of the second gaseous tube with the cathode thereof.

9. A current limiter for a machine tool having a motor winding connected to an alternating current source, comprising a transformer having a primary and a secondary, a saturable reactor having a core, having an alternating current winding on the core and a direct current winding on the core, the primary of the transformer and the alternating current winding on the saturable reactor being connected in series with the motor winding, a source of constant direct current voltage, a diode having an anode and a cathode, means for comparing the secondary voltage of the transformer with the source of constant direct voltage and applying the comparison to the anode and cathode of the diode, a first gas filled tube having an anode, a cathode and a control grid, means for applying a signal from the diode to the control grid of the first gas filled tube, a source of direct current voltage connected between the anode and the cathode of the first gas filled tube, cathode bias means for the first gas filled tube, a second gas filled tube having an anode, a cathode and a control grid, grid bias means for the second gas filled tube, a condenser connected between the anodes of the first and second gas filled tube, means for connecting the control grid and the cathode of the second gas filled tube together and means for connecting the anode and cathode of the second gas filled tube to a source of direct current in series with the direct current winding of the saturable reactor.

10. A current limiter for a machine tool having a motor connected to an alternating current source, comprising a saturable reactor having a core, having an alternating current winding in series with the motor and around the core and having a direct current winding around the core, a pair of gas filled tubes each having a cathode, an anode and a control grid, a source of direct current for the tubes connected to the anodes and cathodes of both tubes and in series with the direct current winding and the anode of one of the tubes, and means interconnecting the tubes and rendering only one tube conducting at a time, cutting off conduction of the other tube when one of the tubes is conducting.

11. A current limiter for a machine having a motor connected to an alternating current source, comprising a saturable reactor having a core, having an alternating current winding in series with the motor and around the core and having a direct current winding around the core, a pair of gas filled tubes each having a cathode, an anode and a control grid, a source of direct current for the tubes connected to the anodes and cathodes of both tubes and in series with the direct current winding and the anode of one of the tubes, and a condenser connected between the anodes of the tubes for rendering only one tube conducting at a time and for cutting off conduction of that tube when the other tube is conducting.

JACOB E. DINGER.

REFERENCES CITED

The following references are of record in the file of this patent:

UNITED STATES PATENTS

| Number | Name | Date |
| --- | --- | --- |
| 2,086,120 | Croden | July 6, 1937 |
| 2,086,594 | Young | July 13, 1937 |
| 2,431,316 | Dudley et al. | Nov. 25, 1947 |
| 2,462,751 | Koehler | Feb. 22, 1949 |